Jan. 26, 1965 G. R. CRANE 3,167,267

TAPE RECORDER

Filed Oct. 24, 1961 4 Sheets-Sheet 1

INVENTOR:
George R. Crane

By

Agent

INVENTOR:
George R. Crane
By Richard [signature]
Agent

Jan. 26, 1965 G. R. CRANE 3,167,267

TAPE RECORDER

Filed Oct. 24, 1961 4 Sheets-Sheet 3

INVENTOR:
George R. Crane
By Richard [illegible]
Agent

Jan. 26, 1965 G. R. CRANE 3,167,267

TAPE RECORDER

Filed Oct. 24, 1961 4 Sheets-Sheet 4

INVENTOR:
George R. Crane

By

Agent

United States Patent Office 3,167,267

Patented Jan. 26, 1965

3,167,267

TAPE RECORDER

George R. Crane, Santa Monica, Calif., assignor to Litton Systems, Inc., Beverly Hills, Calif.

Filed Oct. 24, 1961, Ser. No. 147,302
10 Claims. (Cl. 242—55.13)

This invention relates to tape recording apparatus and, more particularly, devices of this type which are adapted to receive tape cartridges of any conventional design.

Tap cartridges normally include a pair of reels built into an outer casing. Generally, the casing has a number of cutouts, to permit access to exposed lengths of the tape. In the course of developing tape recorders using either magnetic or perforated tapes, and especially with respect to play-back devices of this type, there is a definite trend toward more automatic operation, in order to simplify handling the tape recorders by unskilled persons. This trend is easily understood, considering that tape recorders are widely used in homes for reproducing music or speech. Furthermore, tape recorders are increasingly employed in industrial plants for supplying assembly instructions to workers and in educational institutions as a convenient teaching aid. Since tape recorders as described above are handled by assembly workers, students or, generally speaking laymen, automatic operation constitutes an important factor as far as marketability of the recorder is concerned, especially with respect to the loading and unloading of tape cartridges.

Tape recorders of somewhat older design used separate tape reels which had to be mounted on a generally horizontal panel, frequently termed the "tape deck" of the device. This requires a series of comparatively complicated steps of introducing the tape between guide rollers and other similar elements mounted on the deck to bring the tape into operating position. Thus, the presently conventional tape cartridge represents a definite improvement over the older type of tape recorders. However, together with the improvement, some inconveniences appeared unavoidable. Such inconveniences are based on the fact that the exposed lengths of tape mentioned above must be brought into engagement with the driving mechanism and the transducer head. The problems resulting from this requirement will be better understood from the following discussion of driving mechanisms for tapes.

Numerous designs of tape recorders have been developed in which the tape is transferred from one reel to the other by exclusively driving the wind-up reel. Assuming that the angular speed of the reel is constant, it is clear that the linear speed of the tape does not remain constant when it is wound from one reel onto the other. It is well known that, as the tape builds up on the wind-up reel, the effective radius and with it the linear tape speed, increases, and that this change of tape speed is detrimental to the quality of performance of the apparatus.

In order to eliminate this shortcoming of reel-driven tapes, capstan type driving mechanisms have been developed in which the tape is frictionally engaged between a pinch roller made of rubber or the like and a driving capstan which, in turn, is driven to rotate at a constant speed. However, it requires the use of an additional reel drive mechanism for winding up the tape on the wind-up reel after it passes the transducer head and the capstan. In spite of the fact that a somewhat more complicated driving mechanism is necessary, this type of tape recorder is frequently used in high quality reproduction devices. At this point it should be noted that numerous driving mechanism regulators have been proposed which control the speed of reel drives in such a manner that a constant linear speed is obtained without using capstan drives. However, capstan driving mechanisms are generally employed at the present time and the present invention, therefore, is mainly concerned with tape recorders which use tape cartridges of the type referred to above and which also employ a capstan drive mechanism and a mechanism for driving the wind-up reel, so that the tape is driven at a constant speed and wound up about one of the reels built into the tape cartridge.

Numerous attempts have been made to overcome the difficulty of producing a constant linear tape speed in reel driven recording apparatus. One of these attempts includes an arrangement in which the driving capstan directly cooperates with the tape as it is wound on one of the reels which acts as the pinch roller. However, with the tape building up on the reel, this type of tape recorder necessarily includes provisions for gradually shifting the axis of the reel away from the capstan. Although it appears doubtful whether or not such device performs properly, it involves comparatively complicated arrangements such as especially designed cartridges. Furthermore, it is rather unlikely that the pressure applied to the tape remains constant during the playing of an entire tape from the beginning to the end. Thus, such pressure changes will produce changes in the speed of the tape, and introduce distortion into the recorded signals.

The other attempt mentioned in the foregoing paragraph uses a pinch roller built into the cartridge. However, this arrangement also requires special cartridges which are different from those generally available on the market so that the cartridge including an additional pinch roller has not been generally adopted by the industry.

As stated above, tape cartridges of the type under consideration are provided with cutouts to permit access to exposed lengths of the tape, and the exposed lengths of the tape extending across such cutouts must be brought into engagement with both the capstan driving mechanism and at least one transducer head. These requirements involve a comparatively complicated series of steps when the cartridge is inserted into the device for either recording on the tape or for playing back what had previously been recorded. Since the tape must pass between the capstan and the pinch roller, one of them must be positioned in one of the cutouts in the cartridge, and it will be clear that care must be taken to bring the cartridge into the correct position when loading it into the recorder. One of the serious disadvantages of this arrangement resides in the fact that, when unloading and removing the cartridge from the recording apparatus, the exposed lengths of the tape must be disengaged from its frictional engagement between the capstan and the pinch roller by carefully lifting the cartridge and the tape from its operating position. It will be apparent that if this step is done without this precaution, such as by inadvertently removing the cartridge without disengaging the tape, the tape will be unwound from the cartridge and, in some instances, breakage of the tape or other damages may occur.

The problems associated with the use of tape cartridges are accentuated in the case of recording apparatus which are designed to be loaded from a front panel having an aperture through which the cartridge is inserted, when loading, and through which the cartridge is removed when unloading the recorder. At the present time, there is an increasing demand for front loading recording apparatus, based on several practical reasons. Thus, recording apparatus are built into cabinets dimensioned to fit into racks and this arrangement is frequently encountered when the devices are designed for workers who must have the tape recorder supplying assembly instructions in front of themselves, so that the worker is able to simultaneously watch the recorder and do the work. Similar conditions prevail, by way of example, with students having the recorder on their desks, and it will be readily understood that the front loading tape recorder constitutes a definite improvement over older types of devices into which tape reels or tape cartridges including the reels are inserted from the top of the device.

Accordingly, it is one of the more important objects of the present invention to provide more automatic operation of tape recorders with respect to the loading and unloading steps.

Further objects of the present invention include such improved automatic operation without sacrificing the high quality of reproduction achieved by the use of a capstan driving mechanism for the tape, and, in addition, without sacrificing the advantages obtained when employing tape cartridges instead of separate tape reels.

Another object of the present invention is to facilitate loading and unloading tape cartridges into a recording apparatus by unskilled operators such as assembly workers or students.

A still further object of this invention is to automatically shift, by a constrained motion, the exposed length of tape contained in a cartridge from a predetermined loading position into engagement with all of the active recording elements, which generally include the capstan driving mechanism and a transducer head.

It is another object of the invention to preclude inadvertent removal of the cartridge from the apparatus, as long as the tape is engaged with any one of the driving mechanisms, whereby damage to the tape by carelessly handling the device is practically avoided.

In accordance with the invention, the loading of cartridges as facilitated through the use of two tape decks, one of which is movable with respect to the other to provide an automatic threading of the tape with the capstan driving mechanism and also to provide automatic engagement of other active recording elements. Thus, an improved tape recorder comprises an assembly which may conveniently be termed a dual tape deck. It is well understood that the term "tape deck" refers to the generally horizontally arranged panel which receives the cartridge, and which supports elements of the driving mechanism, at least one transducer head and other components. It is one of the more important concepts of this invention to provide a dual tape deck which comprises a first tape deck assembly for receiving a cartridge in a predetermined position, a second tape deck assembly including at least one tape driving mechanism, and arrangements for shifting the position of one of the tape deck assemblies with respect to the other, so that the tape cartridge is accurately and safely brought into engagement with the elements mounted on one and the other deck.

In practice, and in accordance with one aspect of the invention, the first and second tape decks may be movably joined to each other by a hinge. This important feature permits, as a first step, safely and conveniently inserting a tape cartridge into a holding assembly for the tape associated with the first deck, but in a position away from the driving mechanisms on the other deck. In this initial position, the exposed lengths of tape are axially offset with respect to, for example, the capstan driving mechanism, which is mounted on the other deck. When approaching one deck with the other by a constrained motion such as pivoting about the hinge, the cartridge, and with it the tape in the cartridge, is brought into an operating position with respect to the driving mechanisms. Such mechanisms generally include one for the reels on the cartridge and a capstan drive for the tape. It will be clear that, since the capstan drive is mounted on the other deck and, furthermore, since the cartridge is maintained in a predetermined position on the first deck, the components of the dual deck are designed in such a manner that the tape is guided by a constrained motion, and with all the precision needed, into its operating position, with the exposed tape length mentioned above falling between the capstan and the pinch roller.

In accordance with another feature of the invention, one or more transducer heads are mounted on the movable deck which also includes the holding assembly for the cartridge so that one of the exposed lengths of the tape immediately assumes its operating position with respect to the transducer when the cartridge is inserted into the apparatus.

Further features of the invention include a cam mechanism actuated by relative movement of the two decks for temporarily separating the capstan and the pinch roller, so that an exposed length of the tape is introduced between them when the decks are shifted from the loading position into the operating position.

A further feature of this invention relates to a latching mechanism, preferably part of the cam mechanism, noted above for maintaining the decks in the relative operating position.

A still further feature of the invention includes an arrangement for releasing the latch, which operates to again temporarily separate the capstan from the pinch roller during the short time in which the decks return into the loading position.

Numerous further features of the dual tape deck concept include a stop member engaging the cartridge only when in its operating position so that inadvertent removal and damage to the tape are prevented. When in the loading position, the cartridge can be safely removed, since the stop member is then disengaged from the cartridge and the tape itself is disengaged from the capstan driving mechanism.

It will be understood from the foregoing general discussion that the arrangement termed a dual tape deck constitutes a significant step forward in the design of automatically operated tape recorders. A tape cartridge is loaded into the device, suitably through the front panel of the cabinet, into a predetermined position on the first deck which is generally the movable deck and preferably secured to the second deck by means of a spring-loaded hinge. Once the cartridge has assumed its position on the first deck, a simple pressure applied with the fingertips to the cartridge moves the first deck with the cartridge from its loading position into its operating position. All of the requirements for safely shifting the tape into its operating position with respect to the capstan drive are met by automatically providing the conditions necessary to prevent any damaging step which might be due to the fact that the device is handled by an unskilled person. This includes the automatic separation of the capstan from the pinch roller, locking the decks with respect to each other so that they remain in operating position until released by the operator, the above mentioned stop member to prevent removal of the cartridge before the deck returns into the loading position, and other requirements which are necessary with tape cartridges, such as correct engagement and disengagement of the reels forming part of the cartridge for winding up the tape as it passes through the capstan drive mechanism.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing.

Identical elements are designated by the same reference numerals throughout all of the several views of the drawing.

Figure 1:
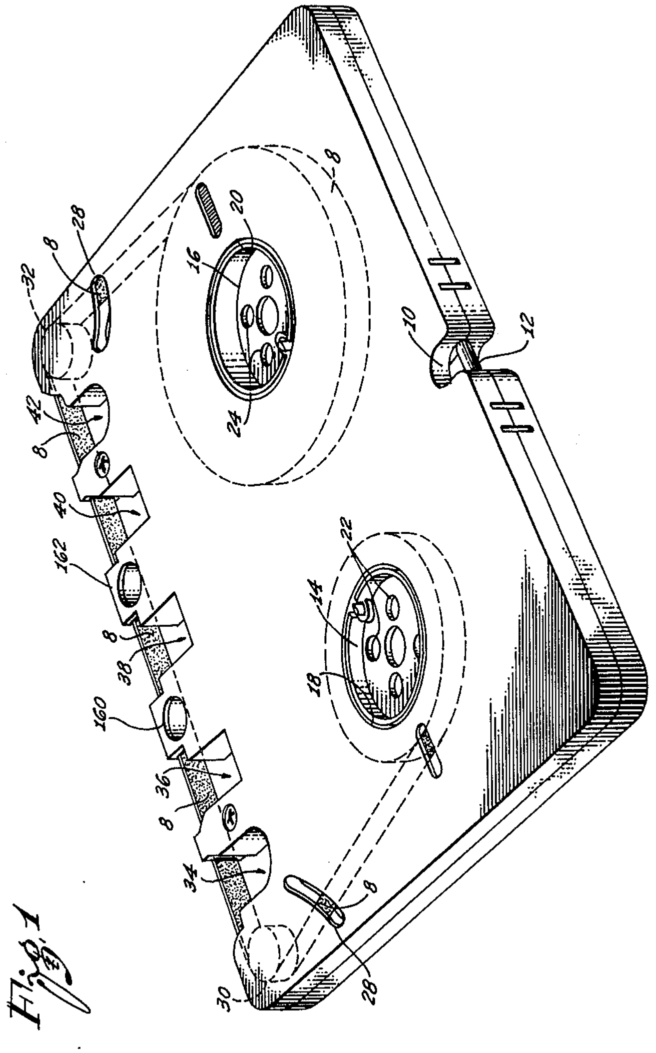
FIG. 1 illustrates a conventional tape cartridge of a type useful in connection with tape recorders of the present invention.

Referring now to FIG. 1, a conventional tape cartridge includes a flat, generally square casing 6, which houses the tape 8. One of the longer sides of the casing 6 forms a recess 10 through which extends a resiliently arranged cross bar 12 for engagement with cooperating stop members on conventional tape recording machines, as is described in detail below. A pair of winding reels 14 and 16 are mounted between the two side walls of the casing 6 within circular openings 18 and 20, respectively. Each of the reels is provided with small openings 22 and 24, for rotating either of the reels to wind the tape 12 either on reel 14 or on reel 16. This is accomplished by a mechanism forming part of conventional recording apparatus and driving a pin which engages either opening 22 or opening 24, as is well known in the art. The corresponding driving mechanism of the recorder of this invention will be described in more detail in connection with the other figures. The casing 6 may include a pair of viewing slots 26 and 28 in which a short length of the tape appears. The tape is passed around a pair of guide rollers 30 and 32 arranged inside and adjacent corners of the casing 6 so that a significant length of tape extends parallel and close to one of the longer sides of the casing. This longer side of the casing 6 is provided with a number of cutouts, five such cutouts being shown in FIG. 1 and designated by reference numerals 34, 36, 38, 40 and 42. An exposed length of the tape 8 extends across each of the cutouts. As stated above, such cartridges, or cartridges of a similar configuration are available on the market and the recording apparatus of the present invention is adapted for use in connection with a cartridge of this type. The numerous different designs of prior art recording apparatus make use of the cutouts for purposes which are basically the same or similar, inasmuch as, when the cartridge is mounted for either recording or playing back recorded information, one of the tape lengths across one of the cutouts may face any one of the following components: a transducer head for playing back such information, a recording head, an erase head, a driving mechanism for the tape, or any combination of some or all of the components mentioned.

Figure 2:
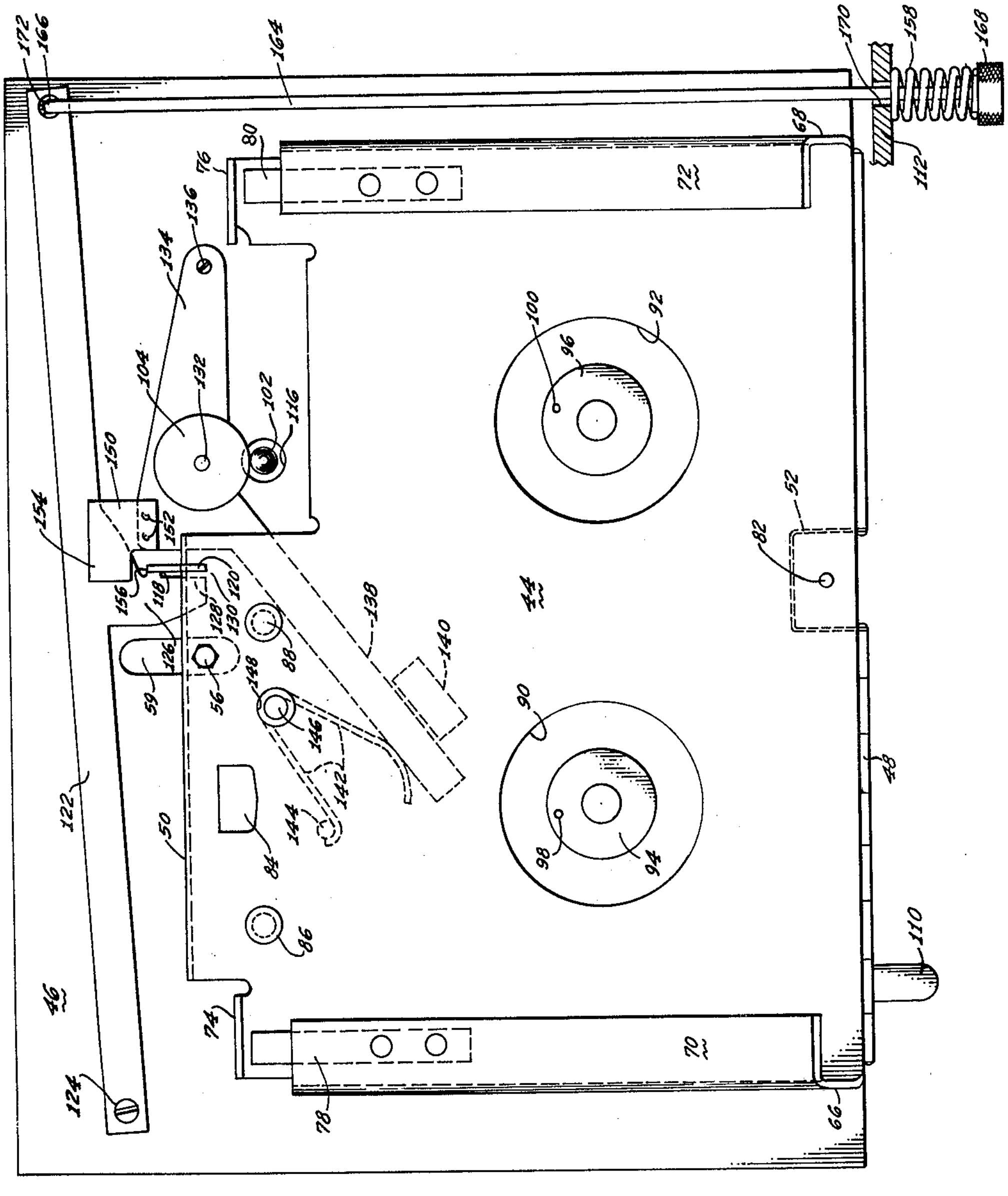
FIG. 2 is a top view of one embodiment of a tape recorder with the decks in operating position.
Figure 3:
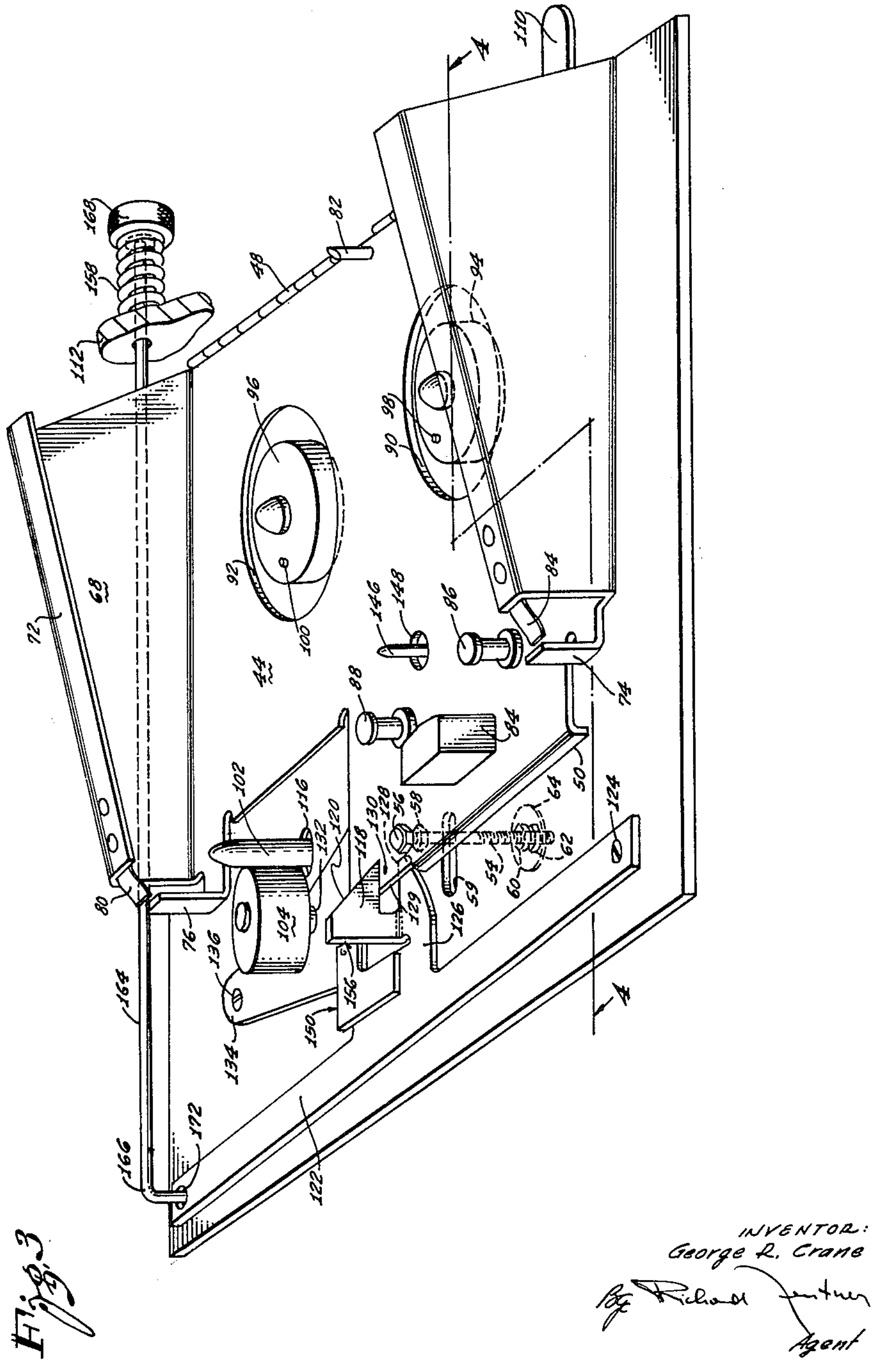
FIG. 3 is an isometric view of the tape recorder of FIG. 2.
Figure 4:
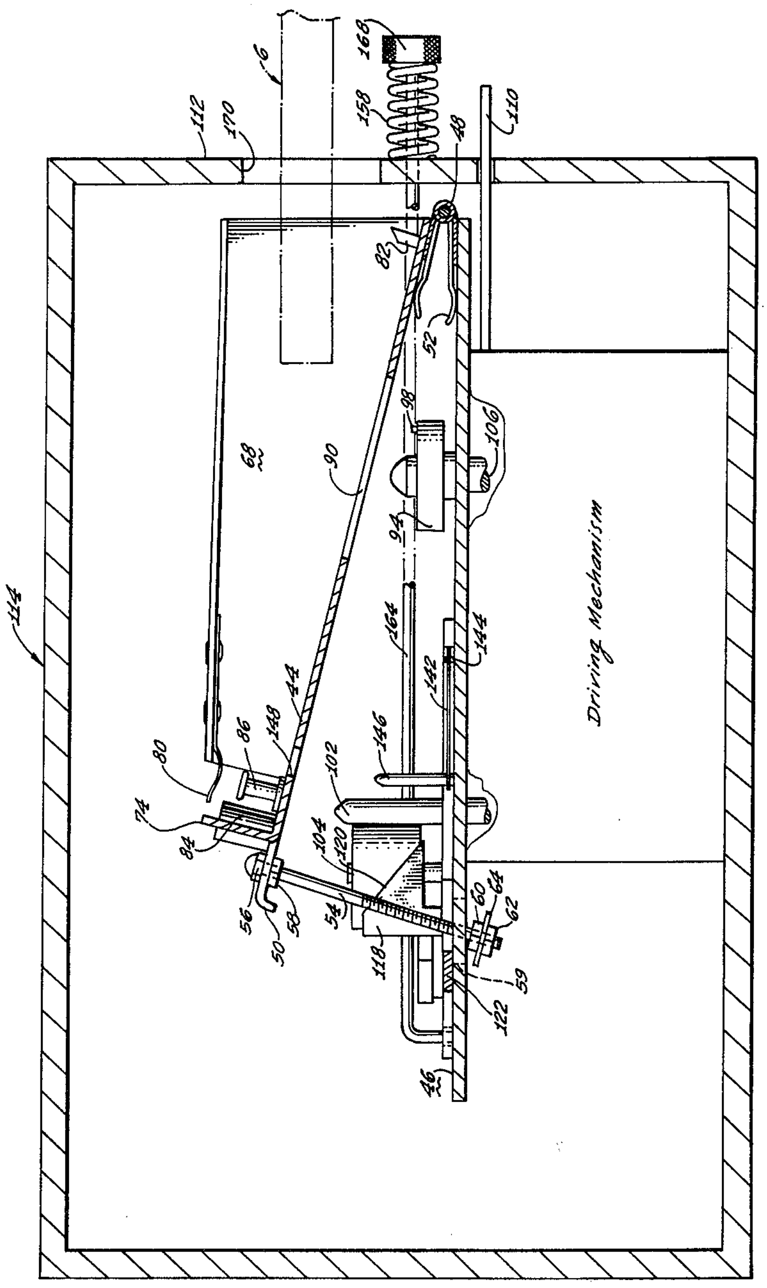
FIG. 4 is a sectional view of the tape recorder of FIGS. 2 and 3, taken along line 4—4 in FIG. 3, and illustrating the decks in the loading position.

Although the dual tape deck of this invention may be used with any of such combinations, FIGS. 2, 3 and 4 illustrate, by way of example, a device adapted for playing back recorded information and therefore including a transducer head, a capstan driving mechanism and a reel driving mechanism as is described below in more detail.

FIG. 2 is a schematic top view of a playback device adapted for use with a conventional cartridge of the type shown in FIG. 1 and illustrates the dual tape deck arrangement of this invention when in operating position, with the cartridge removed to show details of the device. All details unnecessary for the understanding of the invention have been omitted. FIG. 3 is an isometric view of the same embodiment of the invention, also with the cartridge removed. FIG. 4 is a sectional view of the tape recorder with the movable deck in the loading position, and both decks mounted in a cabinet which houses the entire assembly; this figure also shows a cartridge of the type shown in FIG. 1 in the process of being loaded into the apparatus.

As stated above, a tape recorder in accordance with the invention comprises a dual tape deck including a first deck designated by reference numeral 44 and a second tape deck 46. Deck 44 is generally of smaller size and includes a holding assembly which defines a predetermined position for the cartridge. Both decks are joined to each other to permit relative angular motion. Generally, the lower and larger deck 46 is firmly secured to the stationary portion of the apparatus, such as the cabinet, and the smaller deck 44 can be shifted between a loading position and an operating position. It has been found that a convenient means for joining the decks to each other includes a hinge, such as that known under the designation "piano hinge" and illustrated at 48 in FIGS. 2, 3 and 4. The hinge 48 extends along, and joins to each other, a pair of adjacent edges of the decks 44 and 46. The pivoting movement about the hinge 48 permits the movable deck 44 to assume either the loading position (FIG. 4) or the working position with respect to deck 46 in which the curved edge 50 assumes a position in which it contacts, or is very close to, the deck 46, as can be seen in FIG. 3. A bent wire spring 52 is arranged between the two decks, as shown in FIGS. 2 and 4, which spring tends to separate the decks from each other so that they form an acute angle, with the edge 50 of deck 44 spaced from deck 46, as illustrated in FIG. 4. The angular opening in the end position, which is the loading position of deck 44, is determined by a screw stud 54 secured to deck 44 by means of a pair of bolts 56 and 58 (FIG. 3). The stud 54 extends through a slot 59 in deck 46 along which it moves freely when the deck 44 is shifted from one position into the other. A stop assembly including a washer 64 locked between a second pair of nuts 60 and 62 is mounted at the other end of stud 54. As can be seen from FIG. 4, the washer 64 abuts against the lower surface of deck 46 to define the loading position of deck 44.

The movable deck 44, hereinafter frequently referred to as the first deck, forms a holding mechanism for the cartridge in order to maintain it in a predetermined position to insure proper engagement with all of the elements. For this purpose, deck 44 is provided with trapezoidal side walls 66 and 68 supporting upper strips 70 and 72, respectively. This basic shape is suitably obtained by bending each side portion of an initially flat sheet metal member and again bending a portion of each side, both times in a right angle. In a similar manner, a pair of stop members 74 and 76 are provided at the front end of deck 44, so that the narrow front face of the cartridge abuts against the stop members when the cartridge is inserted into the tray-shaped holding assembly composed of elements 44, 66, 68, 70, 72, 74 and 76. A pair of slightly curved flat springs 78 and 80 secured to strips 70 and 72, respectively, form additional components of the holding assembly for the cartridge which maintains it firmly in the desired predetermined position against the deck 44. A guiding pin 82 is provided at the center of deck 44 and adjacent the hinge 48. This pin cooperates with the cutout 10 in the cartridge, FIG. 1. It will be understood that the cartridge is loaded into the device by lifting it over pin 82, sliding it between side walls 66 and 68 while sliding along and below strips 70 and 72 until the front face of the cartridge contacts stop members 74 and 76. At this moment, the cartridge is in a position in which retaining pin 82 engages the resiliently mounted rod 12 in the cutout 10 (FIG. 1), so that the cartridge is now maintained in a predetermined position between all of the mentioned elements.

Additional parts present on the first or movable deck 44 are the transducer head 84 and a pair of guide pins 86 and 88 for the tape. It will be understood that when a cartridge of the type illustrated in FIG. 1 is inserted into the tray-shaped first deck assembly as described, the exposed length of tape extending across cutout 34 (FIG. 1) is maintained against guide pin 86. In a similar manner, guide pin 88 faces the cutout 38 and the exposed tape length in the cutout 38. Simultaneously, the exposed tape length of cutout 36 comes into contact and therefore in a cooperating position with the transducer head 84.

The deck 44 is provided with a pair of circular apertures 90 and 92. These apertures are necessary to permit engagement of the cartridge reels 14 and 16 (FIG. 1) with the reel driving mechanism mounted on the second stationary deck 46. As can be seen from FIG. 4, the apertures 90 and 92 are spaced from deck 46 when deck 44 is in its loading position, so that no engagement with the driving mechanism occurs as long as deck 44 remains in the loading position shown in FIG. 4. The same is true with respect to the capstan driving mechanism which is mounted on deck 46 and therefore spaced from the tape on deck 44.

It is now assumed that an operator introduces a cartridge, such as that shown in FIG. 1, into the tray-shaped holding mechanism of deck 44, as described above. Once the cartridge assumes the predetermined position with respect to deck 44 in which it is fitted between side walls 66 and 68, the stop members 74 and 76, the stop pin 82 and additionally maintained by the flat springs 78 and 80, the operator, with his fingers, applies a slight downward pressure on the cartridge. As a result, the deck 44 with the cartridge is pivotally rotated about hinge 48 until edge 50 contacts, or comes close to deck 46 to assume a position shown in FIG. 2, as best seen in FIG. 3. At this moment, the reel driving mechanism mounted on deck 46 and including a pair of driving wheels 94 and 96 extends through apertures 90 and 92. Upon actuation of the driving mechanism, wheels 94 and 96 start rotating and pins 98 and 100 provided on driving wheels 94 and 96, respectively, engage any of the holes 22 and 24, respectively, in the cartridge tape reels 14 and 16 (FIG. 1).

The following now refers to the capstan driving mechanism and the elements associated with it, which are mounted on the deck 46. This tape driving mechanism includes the capstan 102 and the pinch roller 104. As can be seen in FIG. 4, the capstan 102 extends through the deck 46; similarly, shaft 106 for driving wheel 94 extends through this fixed deck. It is noted that both capstan 102 and shaft 106 are driven to rotate by a conventional mechanism actuated by a motor and which may include clutches, belts, gears and the like. Since this type of driving mechanism, which suitably includes a reverse drive and gears for selecting different speeds, is well known in the art, it is represented by block 108 and not illustrated in detail in the drawing. The driving mechanism may be controlled, for example, by means of a lever 110 protruding through the front panel 112 of the cabinet 114 housing the entire recording apparatus, as shown in FIG. 4. As stated above, capstan 102 extends through deck 46, passing through aperture 116 machined into the deck for this purpose.

In order to safely and without damage bring the tape into engagement with the capstan-pinch roller assembly during the steps of shifting deck 44 between its loading position and its operating position, a combined cam-and-latch mechanism is associated with the pinch roller 104 which separates, temporarily and during the shifting step, the pinch roller 104 from capstan 102. This is accomplished by means of a preferably hook-shaped cam 118 having an inclined surface 120 cooperating with a straight portion 129 of the edge 50 of the movable deck 44. As best shown in FIGS. 2 and 3, cam 118 forms part of a lever 122 which is pivotally mounted about an axis 124 for angular movement within a plane parallel with deck 46. Lever 122 has an extension 126 of which a portion is perpendicularly bent to form the cam 118, with the cam assuming a position in which it forms a right angle with both decks. The extension 126 suitably continues in the plane of lever 122 and protrudes into the area between both decks as shown at 128, so that a recess 130 is formed between cam 118 and protruding portion 128. The function of the recess is to receive the straight location 129 on the edge 50 of deck 44, whereby the deck 44 is locked in its operating position.

The pinch roller 104, rotatably mounted on a short shaft 132, is arranged to be shifted by a movement parallel with the plane of deck 46 when deck 44 engages the cam 118. For this purpose, pinch roller shaft 132 is secured to a second lever 134 mounted to swivel about pivot 136 in a plane which is also parallel with deck 46. Lever 134 has an extension 138 protruding into the space between both decks 44 and 46 and is normally maintained adjacent a stop member 140 under the action of a wire spring 142 (FIG. 2). One end of the spring 142 bears against a pin 144 secured to deck 46, with the other free end of the spring bearing against lever arm 138. The center portion of the spring 142 is wound around a pin 146 secured also to deck 46 and protruding through aperture 148 in deck 44 when the latter assumes the operating position. The main purpose of pin 146 is explained below and, at this point, it will be understood that spring 142 urges lever arm 138 against stop member 140, with all these elements being positioned between the decks. In the position shown in FIG. 2, which is the operating position of deck 44, pinch roller 104 frictionally engages the capstan 102.

It has been stated above that in FIG. 2 the cartridge has been omitted in order to illustrate the different mechanisms involved. However, it will be clear that with a cartridge having been inserted in the tray-shaped holding assembly of deck 44, the exposed tape length appearing in cutout 40 (FIG. 1), would then be frictionally engaged between pinch roller 104 and capstan 102, as can be seen from FIGS. 2 and 3. In this position, the straight location 129 of edge 50 facing the cam 118 is engaged in the recess 130. As a result of this arrangement, deck 44 and with it the cartridge, is maintained in its operating position, with the hook-shaped configuration of cam 118 and recess 130 forming a latch for the deck.

The specific shape of cam 118 including the inclined edge 120 serves the purpose of temporarily releasing the frictional engagement between pinch roller 104 and capstan 102 for the duration of the step of shifting deck 44 from its loading position (FIG. 4) into its operating position (FIGS. 2 and 3). For this purpose, a linking member in the form of an L-shaped hook 150 is welded, for example, by a pair of spot welds 152, to the lever 134 so that the arm 154 of the L overlaps the lever 122 and protrudes into the area above it and adjacent the cam 118 at a short distance from the vertical edge 156 of the cam. It will be apparent that, when the cam 118 is actuated as a result of portion 129 of edge 50 of deck 44 sliding along the inclined edge 120, lever 122 pivots about its axis 124 in a counter-clockwise direction. Then, the vertical edge 156 of the cam entrains the L-shaped member 150, which, in turn, causes the lever 134 to rotate about pivot 136. It will be seen that this movement is executed against the action of spring 142, with lever arm 138 being removed from its contact with stop member 140. Furthermore, this movement is accompanied by the compression of a coil spring 158 mounted around a rod 164, between both the front panel 112 which acts as a stop member, and a push button 168, the latter forming part of the releasing mechanism discussed below. Rod 164 is bent in a right angle at 166 and linked to lever 122 by passing through aperture 172 in the extreme portion of the free lever end.

When the deck 44 continues moving toward deck 46 and passes the extreme point of the hook-shaped cam 118, location 129 of the edge 50 of deck 44 comes into a position where it faces recess 130. Then, lever 122 and with it extension 126, 128 and cam 118 return into their initial position under the action of coil spring 158, and the deck 44 is locked in its position shown in FIGS. 2 and 3. This position is the end position of the hinge movement and constitutes the operating position. With the cam 118 now assuming the position shown in FIGS. 2 and 3, and the deck 44 protruding into recess 130, the L-shaped member 150 is also free to return into its initial position under the action of spring 142 with pinch roller 104 engaging capstan 102. It will be clear that, had a cartridge been maintained on the deck 44 as described above, the tape lengths in cutout 40 (FIG. 1) would have been introduced into the gap formed between pinch roller 104 and capstan 102 when they were separated from each other by the fact that cam 118 entrained the L-shaped member 154, lever 134 and with it the pinch roller 104.

It has been stated above that the pin 146 around which the spring 142 is wound protrudes through aperture 148 into the space above deck 44 when the deck assumes the operating position, as shown in FIG. 3. It can be seen from FIG. 1, that tape cartridges of the type contemplated for use in conjunction with the embodiment of a dual tape deck described herein are provided with additional apertures designated 160 and 162. With pin 146 correctly positioned, aperture 160 in the cartridge receives the protruding portion of the pin so that the cartridge is locked in its position with respect to deck 44 against removal from it, as long as the deck assumes its operating position.

The complete dual deck assembly in accordance with the invention may include a releasing mechanism formed by the elements mentioned above. Such mechanism is schematically indicated by the rod 164 having one end 166 bent in a right angle and linked to the free end of lever 122. The other end of rod 164 suitably protrudes through the front panel 112 which forms the stop against which bears spring 158, as shown in FIG. 4 and described above. The releasing mechanism is actuated by applying pressure to the handle or button 168 whereby lever 122 is forced to swivel around pivot 124. During this motion, extension 126, 128 and cam 118 are again moved away from the deck 44 which is now released from its position where it was locked by the cam 118. Under the action of spring 52 associated with hinge 48, deck 44 returns into its loading position with edge 50 away from deck 46 (FIG. 4). It will be noted that the vertical edge 156 of cam 118 entrains the pinch roller assembly comprising elements 154, 134 and 138, so that the pinch roller 104 is disengaged from capstan 102 as long as pressure is applied to push button 168. In other words, actuation of releasing button 168 disengages both the deck 44 from the latch to return the deck into the loading position, and it also disengages the tape from its frictional engagement between the pinch roller 104 and capstan 102. As a result, the dual tape assembly returns into the loading position of FIG. 4 and precludes any damage to the tape, through the automatic separation of the pinch roller 104 and capstan 102.

As can readily be seen from FIG. 4, the pin 146 is sufficiently short that it does not protrude into the cartridge aperture 160 when deck 44 assumes the loading position. In other words, pin 146, which acts as a stop member for the cartridge in operating position, is now removed from engagement with aperture 160 in the cartridge, so that the cartridge can be removed and replaced by another, if desired, without damaging the tape.

In order to now briefly review the interaction between the components described above, it is assumed that in the beginning the decks 44 and 46 are separated under the action of spring 52 to form an acute angle, as shown in FIG. 4. A cartridge 6 indicated by a broken line in FIG. 4 is introduced into the holding mechanism of deck 44 by sliding it above pin 82 and through opening 170 in front panel 112 until the front edge of cartridge 6 contacts stop members 74 and 76 of which only member 74 is shown in FIG. 4. In this position, the tape 8 in the cartridge engages guide pins 86 and 88 (only pin 86 being shown in FIG. 4), and the tape also assumes its operating position with respect to transducer head 84. The cartridge, upon having been released by the operator, assumes a position in which it engages pin 82 with its cross bar 12 in cutout 10 thereby firmly maintained in this predetermined position, however without engaging either of the driving mechanisms.

The operator now introduces his fingers through the front panel aperture 170 to apply a slight pressure on the cartridge in position. This pressure results in an angular movement of deck 44 about hinge 48 against the action of spring 52. During this movement, the straight portion 129 of edge 50 of deck 44 reaches a position in which it engages the inclined edge 120 of cam 118. Under the action of edge 129, cam 118 and with it the lever 122 move in a direction away from hinge 148, entraining with it the arm 154 of L-shaped member 150, lever 134 and the pinch roller 104. As a result of this action, a gap is formed between pinch roller 104 and stationary capstan 102, with the deck 44 continuing its pivoting movement about hinge 48 toward deck 46. Thus, the tape length appearing in cutout 40 (FIG. 1) of the cartridge is inserted into the gap. At the end of the movement of deck 44, the edge 129 faces the recess 130 so that the cam 118 returns into the locking position of FIGS. 2 and 3 under the action of the coil spring 158. Lever 134 and pinch roller 104 also return into their initial position under the action of spring 142, because the vertical edge 156 of cam 118 is removed from contact with the arm 154 of the L-shaped linking member 150.

At the same time, reels 14 and 16 are brought into cooperation with driving wheels 94, 96 because pins 98 and 100 engage any of the holes 22 and 24, respectively, so that now the reel driving mechanism is engaged with the reels of the cartridge. In addition, pin 146 extends through the opening 148 in deck 44 and into the aperture 160 in the cartridge (FIG. 1). It will be apparent that deck 44 and with it cartridge 6 are now in operating position, both the capstan driving mechanism and the reel driving mechanism being in engagement with the tape 8 and reels 14 and 16, respectively. Furthermore, the cartridge is safely maintained in its position by pin 146 engaging aperture 160 to exclude inadvertent removal of the cartridge. The tape recording apparatus may now be started by actuating lever 110 and used as intended for recording or playing back or erasing some information from the recording tape, as the case may be.

When it is desired to remove the cartridge, lever 110 is returned into its position where the mechanism is stopped. Subsequently, pressure is applied to push button 168 against the action of coil spring 158 to disengage the latching mechanism of cam 118 and simultaneously open the gap between pinch roller 104 and capstan 102, as described above. Deck 44 now returns into its loading position under the action of spring 52, and, upon release of pressure of button 168, levers 122 and 134 return into their initial position by action of springs 158 and 142, respectively. Only when the deck 44 reaches the loading position, shown in FIG. 4 as determined by washer 64 coming into contact with the lower surface of deck 46, pin 146 is disengaged from aperture 160 in the cartridge. Now the operator may lift the cartridge above pin 82 and remove it from the recording apparatus.

It is again stressed that the dual tape deck of this invention is described and illustrated herein in a schematic fashion omitting structural details which have no bearing on the invention.

It is to be understood that the above-described arrangements are illustrative of the application of the principles of the invention. Numerous other arrangements may be devised by those skilled in the art without departing from the spirit and scope of the invention. Thus, by way of example and not of limitation, a complete tape recorder includes, as a matter of course, a driving mechanism which is schematically indicated by the block 108. All electrical parts or elements such as an amplifier, connections to the transducer head 84, a loud speaker or microphones, which may form part of the complete device and built into the cabinet 114, have been omitted.

Furthermore, the combined cam-latch mechanism for releasing the pressure between the pinch roller and the capstan may be modified in any suitable manner. Although the decks 44 and 46 are illustrated as being joined to each other by a piano hinge 48, the linking mechanism may be modified by substituting a spring hinge; any other suitable design may be employed which permits relative movement of the decks so that they can assume an operating position and a loading position with respect to each other. It should be noted that the transducer head may be mounted on the stationary deck 46, if desired, instead of being mounted on deck 44, as shown. The holding mechanism for the cartridge may be modified in numerous different manners and the same applies to the releasing mechanism for the cam-latch assembly which, by way of example, may be actuated by a pulling action instead of a pushing action. The panel 112 with aperture 170 on which appear the releasing button 168, the actuating lever 110 for the driving mechanism 108 and other controls not mentioned has been referred to as the front panel in accordance with conventional terminology. However, it is to be understood that the position of the recording apparatus is selected by the user so that, under specific circumstances, panel 112 may be a side panel, as viewed from the operator, if such arrangement is preferred. Finally, any other retaining member different from pin 146 cooperating with aperture 160 may be employed for retaining the cartridge safely in its operating position to prevent damage due to inadvertent removal. With respect to the tape cartridge, there are single reel cartridges available, using an endless loop tape, and the dual deck recording apparatus of this invention may readily be modified for use with such cartridges. Accordingly, from the foregoing remarks, it is to be understood that the present invention is to be limited only by the spirit and scope of the appended claims.

What is claimed is:

1. A dual tape deck for recording machines using tape cartridges, comprising a first tape deck assembly including a transducer head for receiving a cartridge and maintaining it in a predetermined position with respect to said transducer head, a second tape deck assembly including at least one tape driving mechanism, and means for shifting the position of one of the tape deck assemblies with respect to the other tape deck assembly to selectively engage the tape with the driving mechanism and to disengage the tape from it.

2. In combination, first and second tape decks, a transducer head mounted on said first deck, a tape cartridge holding assembly associated with the first deck for receiving a cartridge and maintaining it in a predetermined operating position with respect to said transducer head, a capstan-type driving mechanism mounted on the second deck, and hinge means movably joining one deck to the other to permit switching the position of one deck with respect to the other deck, thereby selectively causing the capstan drive to engage and to disengage the tape.

3. In combination, first and second tape decks, a transducer head mounted on said first deck, a tape cartridge holding assembly associated with the first deck for receiving a cartridge and maintaining it in a predetermined operating position with respect to said transducer head, a capstan-type driving mechanism for the tape mounted on the second deck, a reel driving mechanism also mounted on the second deck, and hinge means movably joining one deck to the other to permit switching the position of one deck with respect to the other deck, thereby selectively effecting engagement and disengagement of both the tape with the capstan drive and the cartridge reels with the reel driving mechanism.

4. In combination, first and second tape decks joined to each other by a single hinge, at least one transducer head, tape guides and holding means on the first deck for maintaining a tape cartridge in a predetermined operating position with respect to said transducer head, a capstan driving mechanism mounted on the second deck, and means for temporarily placing and maintaining the tape in an operating position with respect to the capstan driving mechanism by a rotational movement of the first deck about the hinge.

5. In a tape recording apparatus, first and second tape decks, at least one transducer head mounted on said first deck, a tape cartridge holder also associated with the first deck for maintaining a cartridge in a predetermined fixed operating position with respect to said transducer head and said first deck, a capstan-type driving assembly mounted on the second deck and, hinge means for pivotally joining one deck to the other to permit relative, angular motion of one deck with respect to the other between two end positions, the tape being in engagement with the capstan drive when the first deck is in one of the positions, and the tape being disengaged from the capstan drive when the deck is in the other position, the tape remaining in its operating position with respect to said transducer head, regardless of the position assumed by said first deck.

6. In a recording apparatus for use with tape cartridges, first and second tape decks, at least one transducer head mounted on the first tape deck, means for removably maintaining a cartridge in a predetermined position on the first tape deck to cooperate with the transducer head, a capstan-type tape driving mechanism associated with the second tape deck, means for selectively shifting the first deck between an operating position and a loading position, the capstan drive engaging the tape when the first tape deck is in its operating position, and the tape being disengaged from the capstan drive when the deck assumes its loading position, and retaining means including a stop member mounted on the second deck and extending through a hole in the first deck into an aperture in the tape cartridge for retaining the cartridge in its operating position when engaging the driving mechanism to prevent inadvertent removal of the cartridge when the tape engages the driving means, the stop member being disengaged from the aperture when the first deck assumes the loading position.

7. In a recording apparatus using tape cartridges having at least one cutout with an exposed length of tape extending across the cutout, first and second tape decks, at least one transducer head mounted on said first deck, means for removably maintaining a cartridge on said first deck in a predetermined operating position with respect to said transducer head, a tape driving mechanism including a capstan and a pinch roller cooperating with the capstan associated with the second deck, and means for shifting the first deck into an operating position, with the exposed tape length assuming a position between the capstan and the pinch roller for frictional engagement, said shifting means including means for temporarily separating the capstan from the pinch roller during the shifting steps.

8. In a recording apparatus using tape cartridges having at least one cutout with an exposed length of tape extending across the cutout, first and second tape decks, at least one transducer head mounted on said first deck, means including a single spring-loaded hinge secured substantially alongside adjacent edges of the first and second decks for pivotally mounting one with respect to the other to permit rotationally shifting the first deck between an operating position and a loading position, with the portions of the two decks remote from the hinge being positioned adjacent one another in the operating position and being spaced apart in the loading position, means for removably maintaining a cartridge on said first deck in a predetermined position with respect to said transducer head, a tape driving mechanism including a capstan and a pinch roller cooperating with the capstan associated with the second deck, a reel driving mechanism also associated with the second deck, the exposed tape length being positioned offset with respect to the capstan-pinch roller assembly and the reel driving mechanism being disengaged from the cartridge when the first deck assumes its loading position, a spring-loaded combined cam-latch assembly associated with the second deck to cooperate with the first deck, the cam engaging a portion of the first deck away from the hinge for separating the pinch roller from the capstan to form a gap between them during the step of shifting the first deck from the loading position into the operating position, one end portion of the cam having a recess to cause the gap to close under the action of the spring associated with the cam-latch assembly to form a latch which maintains the decks in operating position with the capstan and the pinch roller frictionally engaging the exposed tape length and the reel driving mechanism engaging the cartridge reels, and means for releasing the cam-latch assembly to permit the first deck to return into its loading position under the action of the spring associated with the hinge, the tape remaining in its operating position with respect to said transducer head, regardless of the position assumed by said first deck.

9. In a recording apparatus using tape cartridges having at least one cutout with an exposed length of tape extending across the cutout, first and second tape decks, means including a spring-loaded hinge secured substantially alongside adjacent edges of the first and second decks for pivotally mounting one with respect to the other to shift the first deck between an operating position and a loading position, with the portions of the two decks remote from the hinge being positioned adjacent one another in the operating position, and being spaced apart in the loading position, at least one transducer head and tape guides mounted on said first tape deck, means for removably maintaining a cartridge on said first tape deck in a predetermined operating position with respect to said transducer head, a tape driving mechanism including a capstan and a pinch roller cooperating with the capstan associated with the second deck, the exposed tape length being positioned offset with respect to the capstan-pinch roller assembly when the first deck assumes its loading position, a spring-loaded combined cam-latch assembly associated with the second deck to cooperate with the first deck, the cam engaging a portion of the first deck away from the hinge for separating the pinch roller from the capstan to form a gap between them during the step of shifting the first deck from the loading position into the operating position, one end portion of the cam having a recess for receiving the portion of the first deck to close the gap under the action of the spring associated with the cam-latch assembly to form a latch which maintains the decks in operating position with the capstan and the pinch roller frictionally engaging the exposed tape length, means for actuating the cam-latch assembly to release the first deck to return into its loading position under the action of the spring associated with the hinge, and retaining means including a stop member mounted on the second deck and extending through the first deck into an aperture in the tape cartridge for retaining the cartridge in its operating position when the tape engages the driving mechanism, the stop member being disengaged from the cartridge aperture when the first deck assumes the loading position, the tape remaining in its operating position with respect to said transducer head, regardless of the position assumed by said first deck.

10. In a recording apparatus, first and second tape decks relatively movable with respect to each other between an operating position and a loading position, means for holding a tape cartridge on said first tape deck, means including a capstan and a pinch roller associated with said second tape deck for engaging and driving the tape, and means operated by the first tape deck for automatically separating said capstan and said pinch roller as said first and second tape decks are moved with respect to one another between the operating and loading positions.

References Cited in the file of this patent

UNITED STATES PATENTS

| | | |
|---|---|---|
| 2,560,234 | Masterson | July 10, 1951 |
| 2,969,929 | Rudzitis | Jan. 31, 1961 |
| 3,080,101 | Kreithen et al. | Mar. 5, 1963 |
| 3,083,925 | Schoebel | Apr. 2, 1963 |